United States Patent [19]

Gabas

[11] Patent Number: 5,054,734
[45] Date of Patent: Oct. 8, 1991

[54] SUPPORT BRACKET FOR ATTACHMENT TO AUTOMOBILE SUN VISORS

[75] Inventor: Carlos Gabas, Barcelona, Spain

[73] Assignee: Industrias Techno-Matic, S.A., Barcelona, Spain

[21] Appl. No.: 529,231

[22] Filed: May 25, 1990

[30] Foreign Application Priority Data

May 26, 1989 [ES] Spain .................... 8901785

[51] Int. Cl.$^5$ ............................ B60J 3/02
[52] U.S. Cl. ..................... 248/316.5; 248/231.6; 296/97.9
[58] Field of Search ........... 248/316.5, 316.7, 231.6, 248/340; 24/713.6, 543, 487; 296/97.9

[56] References Cited

U.S. PATENT DOCUMENTS

| 3,629,912 | 12/1971 | Klopp | 24/543 X |
| 3,665,563 | 5/1972 | Batts | 24/543 |
| 3,982,307 | 9/1976 | Smith et al. | 24/543 |
| 4,212,303 | 7/1980 | Nolan | 24/543 X |
| 4,536,924 | 8/1985 | Willoughby | 24/543 X |
| 4,668,005 | 5/1987 | Dietz | 296/97.9 |
| 4,807,334 | 2/1989 | Blanchard | 24/487 |
| 4,859,171 | 5/1986 | McGill | 24/543 |

FOREIGN PATENT DOCUMENTS

| 1522441 | 4/1968 | France | 24/487 |
| 614570 | 12/1960 | Italy | 24/487 |
| 292645 | 3/1986 | Spain . | |
| 8701253 | 4/1987 | Spain . | |
| U8901522 | 5/1989 | Spain . | |

Primary Examiner—Alvin C. Chin-Shue
Attorney, Agent, or Firm—Michael J. Striker

[57] ABSTRACT

A support bracket attachable to automobile sun visors comprises a main body formed of two leaves of identical shape and size that are joined together on one of their sides by a weak joint that acts like a hinge around which they can rotate to become coupled face to face to define in the coupling position a support and an approximately rectangular slot.

1 Claim, 1 Drawing Sheet

SUPPORT BRACKET FOR ATTACHMENT TO AUTOMOBILE SUN VISORS

BACKGROUND OF THE INVENTION

1. Field of the Invention

The invention relates to a support bracket that can be attached to automobile sun visors and particularly to sun visors covered with a fabric, leather or a similar material.

2. Description of the Prior Art

It is well known that car sun visors usually consist basically of a relatively stiff body, such as polyurethane foam, which surrounds a structural frame generally made of stiff plastic materials. This reinforcing frame includes or incorporates both the support shaft and the support bracket of the visor, the former being for the purpose of allowing the user to shift the sun visor to different positions from the normal one, and the latter for the purpose of ensuring, by pressing it into a hook provided in the roof of the cockpit area, that the sun visor remains immobilized in the normal positon of use envisaged by the manufacturer of the vehicle. The support bracket forms the side that closes off the U-shaped opening in the sun visor. This support bracket is usually formed by the actual visor itself, as shown in the Spanish Utility Models Nos. 292-645 and 8701253.

Utility model application No. U 8901522 discloses a sun visor the covering of which is made solely of fabric or leather materials which can even be the same as those used for lining the interior of the vehicle. In these cases, the support bracket cannot be formed at the base because it would be impossible to cover it accordingly.

SUMMARY OF THE INVENTION

The object of the invention is a separate support bracket attachable to automobile sun visors fitted with a covering made solely from fabric or leather materials.

The support bracket which is attachable to automobile sun visors and is the subject of this invention has the same function as the one which up to now was generally incorporated into the structure of sun visors, forming a single element. The use of the attachable support bracket does not cause any weakening of the structure whatsoever that might have affected the mechanical strength of the sun visor. The structure of the aforesaid attachable support bracket has been designed to allow its fitting to the sun visor after the latter has been covered with the corresponding fabric or leather, thereby providing a complete solution to the problem described previously.

Consequently, this support bracket which is attachable to automobile sun visors can be used on any visor structure that has a U-shaped opening of the corresponding dimensions.

The support bracket for attachment to automobile sun visors which is the subject of this invention is characterized in that it consists of a main body made from materials suitable for the use and purpose envisaged and, preferably, from plastic materials. The main body comprises two leaves of the same external shape and form, which are joined together on one side by a weak joint acting as a hinge around which they can rotate and be clipped together facing each other, in such a way that in this position of being coupled together, they define a support bracket and an approximately rectangular slot.

Another characteristic of the support bracket according to the invention for attachment to automobile sun visors consists in that one of the leaves making up the main body, also comprises a crosspiece that forms the support bracket when both leaves of the main body are coupled together.

A further characteristic of the support bracket according to the invention for attachment to automobile sun visors consists in that each of the leaves making up the main body comprises one or more interlocking catches for fixing the coupling position.

The longitudinal interlocking catches mentioned above are for the purpose of joining the attachable support bracket of the invention to the sun visor of the vehicle. They are large enough to ensure a secure joint and to prevent the attachable support bracket, under normal conditions of use of the sun visor and particularly when the support bracket is pressed into the corresponding holder provided in the roof of the vehicle's cockpit, from suddenly becoming detached from the sun visor.

Adaptation of the attachable support bracket of the invention to the sun visor is extraordinarily simple and requires no tools or implements since, with the sun visor already fitted with its relevant covering, both leaves of the main body, facing each other, although without actually being coupled together, are inserted into the U-shaped opening on the perimeter of the sun visor, generally on one of the longer sides, and subsequently, once the longitudinal interlocking catches have in turn been inserted into the relevant slot in the sun visor, both outside surfaces of said leaves are pressed until the longitudinal interlocking catches joining the attachable support bracket to the sun visor and the interlocking catches joining both leaves of the main body when they meet up, become clipped together, thereby giving the attachable support bracket and sun visor assembly a flush fit and neat finish.

The present invention both as to its construction so to its mode of operation, together with additional objects and advantages thereof, will be best understood from the following detailed description of the preferred embodiment when read with reference to the accompanying drawings.

DETAILED DESCRIPTION OF THE PREFERRED EMBODIMENT

Figure 1:
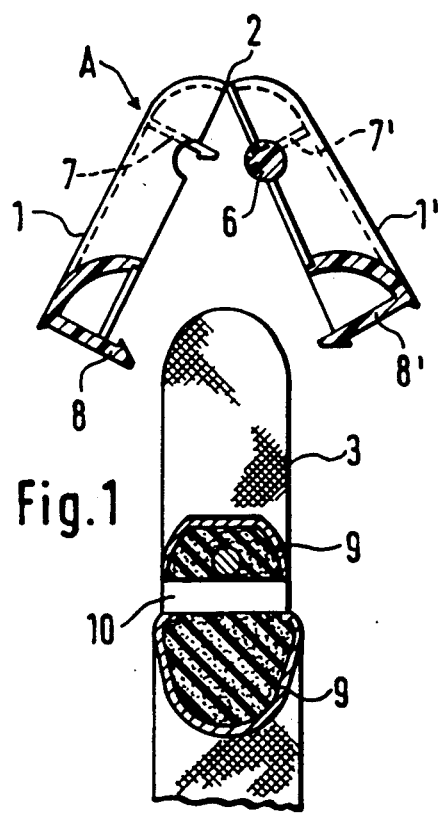
FIG. 1 is a cross-sectional view of a support bracket of the invention prior to its being fitted to a sun visor.
Figure 2:
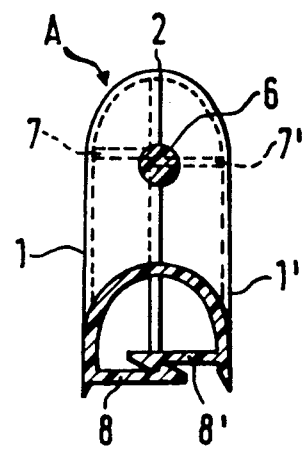
FIG. 2 is a cross-sectional view of a support bracket of the invention in an attached position thereof.

The support bracket for attachment to automobile sun visors according to the invention and which is described here consists of a main body A, made from materials suitable for the use and purpose envisaged, preferably from plastic materials, which in turn consists of two leaves 1 and 1' identical in external shape and form, which are joined on one of their sides by a weak joint 2 acting as a hinge around which they can rotate and meet up face to face, as shown in FIGS. 1 and 2 of the drawings.

Figure 4:
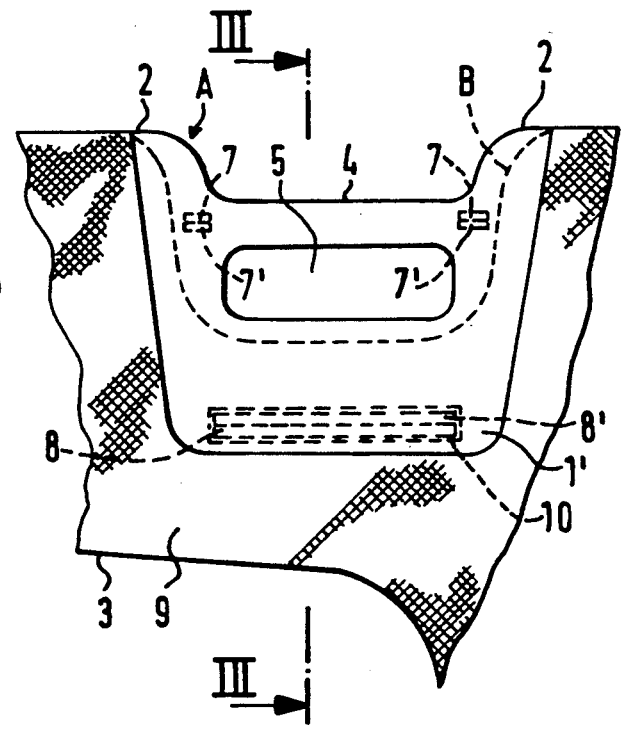
FIG. 4 is a frontal view of a support bracket of the invention fitted to a sun visor.

The external shape and form of leaves 1 and 1' of the main body A corresponds to the U-shaped outline B of the sun visor 3 on one of its long sides, as shown in FIG. 4 of the drawings. When both leaves 1 and 1' are facing each other and coupled together as shown in FIG. 2, they define a support bracket 4 and a rectangular slot 5, as seen in FIG. 4.

Figure 3:
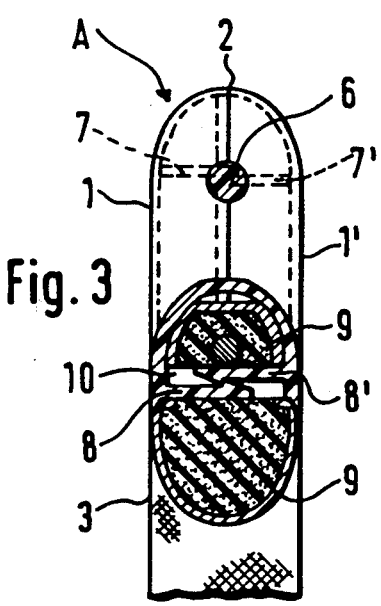
FIG. 3 is a cross-sectional view of a support bracket of the invention and a sun visor taken alone line III—III in FIG. 4.

The support bracket 4, which in this embodiment is circular in section, as shown in FIGS. 1, 2 and 3, has the same size in length and cross-section as the hook (not shown) provided in the roof of the vehicle's cockpit for fixing the sun visor 3 in its normal position of use, and into which the support bracket 4 is inserted.

The rectangular slot 5 is big enough to take the corresponding part of the support described above once the support bracket has been inserted in it.

The support bracket 4 defined by both leaves 1 and 1' when they are coupled together as shown in FIGS. 2, 3 and 4, consists of the crosspiece 6 which is strong enough and suitable for the function assigned to it. It is preferably solid and circular in section, like the example illustrated in the drawings. It can also be seen that the crosspiece 6 is an integral part of the leaf 1'.

In this embodiment of the support bracket that is attachable to automobile sun visors, each of the leaves 1 and 1' making up the main body A has two interlocking catches at both ends of the support bracket 4, as shown in FIG. 4. Leaf 1 carries both interlocking catches 7 and leaf 1' carries both interlocking catches 7', the interlocking catches 7 and 7' being set facing each other such that once interlocked they cannot become unattached, as shown in FIGS. 2 and 3.

Both pairs of interlocking catches 7 and 7' are for the purpose of joining together both leaves 1 and 1' when they meet up face to face as shown in FIG. 2. This permits to avoid, in the case of breakage or wear of the weak joint 2, the coming apart of leaves 1 and 1' precisely on the side along which they are joined, which would make the attachable support bracket inoperative.

For joining the main body A of the attachable support bracket referred to in the invention to the sun visor 3, each of the leaves 1 and 1' has a longitudinal interlocking catch located respectively on the side of the leaf opposite to the side with the weak joint 2, as shown in all the Figures. Leaf 1 has longitudinal interlocking catch 8, and leaf 1' has longitudinal interlocking catch 8'. The interlocking catches 8 and 8' face each other such that once interlocked or clipped together they cannot become unattached, as shown in FIGS. 2 and 3.

The longitudinal interlocking catches 8 and 8' are generously dimensioned to ensure good joining between the main body A of the attachable support bracket and the sun visor 3.

In the Figures, the sun visor 3 has been drawn with its covering 9, which can be made from either fabric or leather materials that can even be the same as those used for lining the interior of the vehicle, particularly those used for lining the roof and door panels, or from plastic materials or fabrics with a layered plastic support. The sun visor 3 has a slot 10 which corresponds in size to the longitudinal interlocking catches 8 and 8' when the latter are clipped together, so that both longitudinal interlocking catches 8 and 8' will fit snugly into the slot 10 once they are coupled or clipped together.

Fitting the attachable support bracket of the invention to the sun visor 3 after the latter's covering 9 has been applied, is shown in FIGS. 1, 3 and 4. FIG. 1 shows leaves 1 and 1' that make up the main body A closing on each other but without going so far as actually inter-connecting, indicating how they can be inserted into the opening defined by the U-shaped outline B on one of the long sides of the sun visor 3. FIGS. 3 and 4 show the attachable support bracket mounted on the sun visor 3 after the clipping together of interlocking catches 7 and 7' as well as the longitudinal interlocking catches 8 and 8'. The latter are located in the slot 10 of sun visor 3, thereby ensuring a firm coupling between the leaves 1 and 1' that make up the main body A, and a firm coupling between the sun visor 3 and the support bracket according to the invention.

While the invention has been illustrated and described as embodied in a support bracket for automobile sun visors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sun visor assembly for automobiles, comprising a sun visor having a portion with a substantially U-shaped outline, said sun visor also having a throughgoing slot; and a support bracket including two leaf members having identical U-shaped outline and pivotally connected with one another to be pivoted between an open position in which they do not hold said sun visor and a closed position in which they surround said portion of said sun visor and hold the same, each of said leaf members having a slot provided in an area which is free of said sun visor in said closed position and adapted to receive a support for securing the sun visor in a predetermined position in a vehicle, each of said leaf members having an interlocking catch which in said closed position extends through said throughgoing slot of said sun visor and interlocks with another one of said interlocking catches, each of said leaf members also having a further interlocking catch which in said closed position is located outside said sun visor and interlocks with another of said further interlocking catches wherein one of said two leaf members has a cross-piece defining a sun visor support in said closed position while the other of said leaf members has a recess for receiving said cross-piece in said closed position.

* * * * *